March 25, 1952 H. A. BREDEHOFT ET AL 2,590,500

TELEPHONE RINGER

Filed April 9, 1949 2 SHEETS—SHEET 1

INVENTORS: H. A. BREDEHOFT
M. S. RICHARDSON

BY A. J. Kane

ATTORNEY

March 25, 1952 H. A. BREDEHOFT ET AL 2,590,500

TELEPHONE RINGER

Filed April 9, 1949 2 SHEETS—SHEET 2

INVENTORS: H. A. BREDEHOFT
M. S. RICHARDSON

BY A. F. Kane

ATTORNEY

Patented Mar. 25, 1952

2,590,500

UNITED STATES PATENT OFFICE 2,590,500

TELEPHONE RINGER

Harold A. Bredehoft, Millington, and Max S. Richardson, Summit, N. J., assignors to Bell Telephone Laboratories, Incorporated, New York, N. Y., a corporation of New York Application April 9, 1949, Serial No. 86,518

8 Claims. (Cl. 177—7)

This invention relates to electromagnetically operated signaling devices and more particularly to polarized ringers of the type employed extensively at telephone substations.

Since the advent of the combined type of telephone set which is characterized by the mounting in the base thereof of those components of the substation equipment housed previously in a separate container, or bell box, continuous efforts have been directed to the redesign of such components with a view towards space conservation and an ultimate reduction in the size and weight of the telephone set without increasing the cost or otherwise limiting the operating capabilities of these components. The components now housed in the base of the telephone set include the ringer, its associated condenser and the induction coil. Of these the telephone ringer has received considerable attention in efforts to secure an improved design which would contribute to the attainment of the over-all objective of the most economical use of available space and reduction in weight of the combined telephone set.

In a copending application Serial No. 66,619 filed December 22, 1948, now Patent No. 2,547,537, dated April 3, 1951, there is disclosed a telephone ringer design which accentuates reduced size and weight and which otherwise contributes to greater operating efficiency of such devices.

It is the object of this invention to further improve the design of telephone ringers of the type disclosed in the above-identified copending application from the viewpoints of efficiency of operation, and economical use of available space and reduction in weight of the combined telephone set.

This object is attained in accordance with a feature of the invention by the use of a magnetic circuit which embodies multiple shunts of metals with dissimilar magnetic characteristics. More particularly, the magnetic circuit of the ringer of this invention employs a shunt of silicon steel together with a shunt of magnetic iron which cooperate in imparting to the ringer particularly desirable characteristics at different frequencies and currents. The silicon steel material is found to be more effective at very low current values and high frequencies and the magnetic iron is of greater effectiveness at ringing frequencies and currents.

Another feature of the invention which contributes materially to an over-all simplicity of mechanical design and efficiency of operation resides in the use of a unitary structure comprising the magnetic iron shunt, the pole-pieces and supports for the coil-bearing core, the silicon steel shunt and a bar-type permanent magnet.

A further feature of the invention contemplates a mounting for the ringer motor unit which comprises a sheet spring or reed having the section thereof about which oscillation of the motor unit takes place located in the plane of the polar axis of the polarizing permanent magnet.

These and other features of the invention will be readily understood from the following detailed description when read with reference to the accompanying drawings in which.

Figures 1, 4:
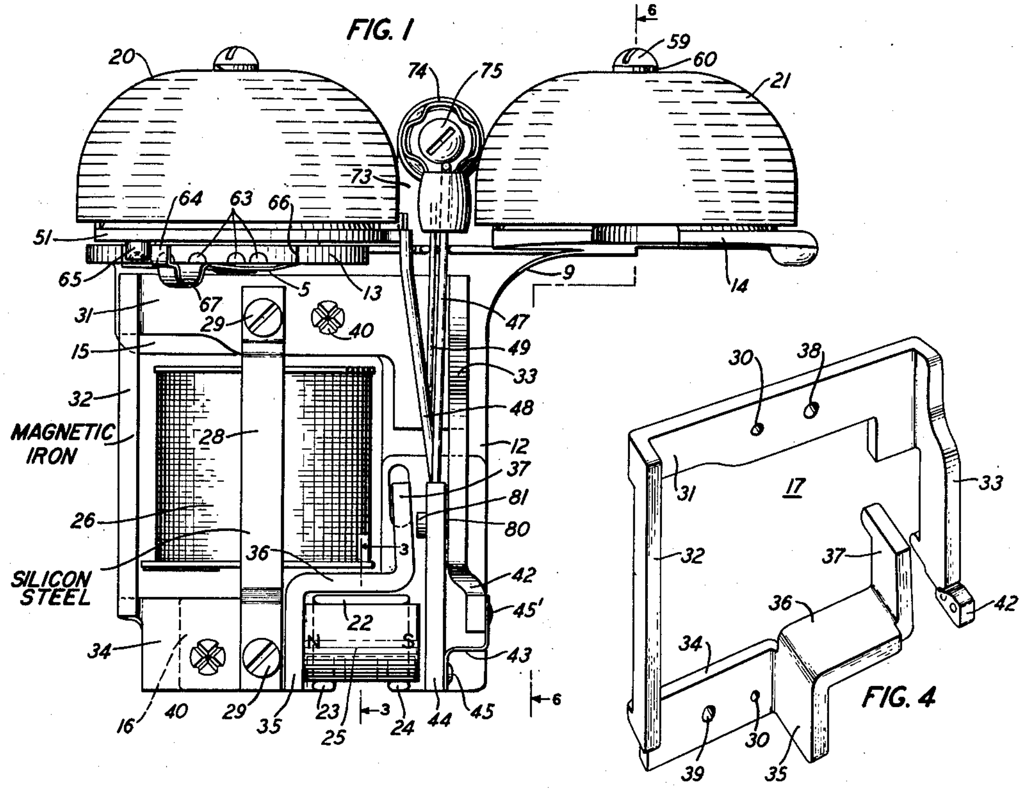
Fig. 1 is a front plan view of a telephone ringer embodying the features of the invention.
Fig. 4 is a perspective view of the unit pole-piece which cooperates with other elements of the ringer in effecting a magnetic circuit of novel configuration and which provides means for mounting the coil-bearing core, the silicon steel shunt and the permanent magnet.
Figure 5:
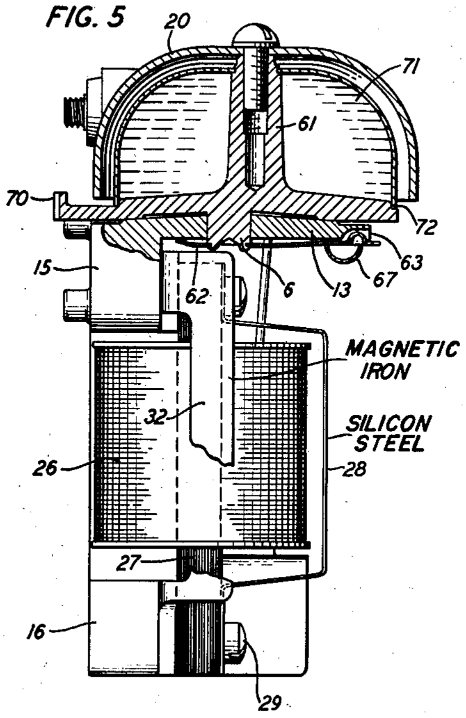
Fig. 5 is a section taken along the line 5—5 of Fig. 2 and looking in the direction of the arrows.
Figure 6:
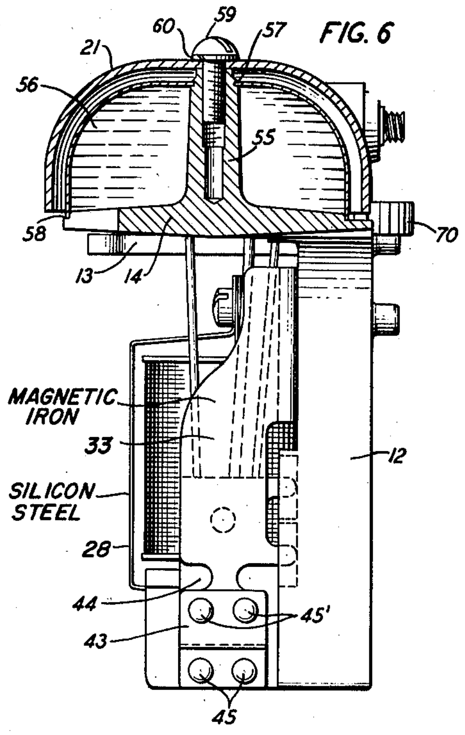
Fig. 6 is a sectional view of the ringer taken along the line 6—6 of Fig. 1, looking in the direction of the arrows.

The ringer of this invention, as disclosed in the drawings, is mounted on a suitably configured frame 10 which may be die cast of aluminum or of any other suitable material. The frame 10 is essentially a spider-like formation consisting of a central post 12, two right angularly disposed arms 15 and 16 projecting respectively, from the upper and lower ends of the post 12, and a pair of table-, or shelf-like integral projecting sections 13 and 14 which are generally circular, or disc-like in configuration. The frame sections 13 and 14 are joined by an interconnecting frame portion 19 (Fig. 2) which, actually, constitutes the upper extremity of the frame post 12. As indicated in Figs. 1, 5 and 6, the table-like sections 13 and 14 occupy different horizontal planes. The frame curvature designated by the numeral 9 in Fig. 1 identifies a reinforcing webbing extending from the underside of the table-like projection 14 to the centrally disposed post 12. As will be described in detail hereinafter the sections 13 and 14 serve to mount the gongs 20 and 21, respectively.

Figure 3:
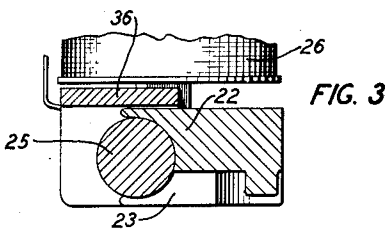
Fig. 3 is a fragmentary section taken along the line 3—3 of Fig. 1 and looking in the direction of the arrows.

The lower arm 16 of frame 10, near the post 12, is provided with three forwardly projecting flanges, or lugs 22, 23 and 24 the inner surfaces of which are cylindrically concave as more clearly evident in Fig. 3. The projection 22 is relatively long and, viewing Fig. 3, overhangs the two smaller spaced projections 23 and 24 whose outer ends are in substantial alignment with the corresponding ends of the projection 22. These three projections of the frame combine to effect a seat for a cylindrical bar-type permanent magnet 25.

The ringer includes a single coil 26 mounted on a laminated core 27 consisting of a plurality of rectangular silicon steel laminations stacked as a unit for assembly on a unit pole-piece 17 together with an externally mounted silicon steel shunt 28. The core laminations and the shunt 28 are secured to the unit pole-piece by means of screws 29 which pass through suitable holes in the core laminations and through holes 30 in the unit pole-piece and are screwed into suitably tapped holes in the arms 15 and 16 of the frame.

The unit pole-piece 17 (Fig. 4) comprises four integrally joined sections 31, 32, 33 and 34, the last of which terminates in three smaller integral rectangular sections 35, 36 and 37. The sections 31, 32, 33, 34 and the smaller sections 35, 36 and 37 form a substantially rectangular outline the continuity of which is broken by a small spacing between opposed faces of sections 33 and 37. The opposed faces of sections 33 and 37 define the air-gap of the magnetic circuit involved in the electromagnetic system of the ringer. A slight inclination of section 37 from normal gives the air-gap a non-uniformity of length.

The unit pole-piece sections 35 and 36 are so disposed relative to the frame projections 22, 23 and 24 when the pole-piece is mounted on the frame in a manner to be described, that the permanent magnet 25 carried by the frame projections is located immediately below the section 36 and has one end abutting the section 35.

Sections 31 and 34 of the unit pole-piece are suitably apertured at 38 and 39 to accommodate studs 40 which are staked over to secure the pole-piece 17 and to the arms 15 and 16 of the frame 10. The unit pole-piece 17 is of magnetic iron and the section 32 thereof constitutes a magnetic iron shunt which, with the silicon steel shunt 28 serves to impart to the ringer the desirable characteristics hereinbefore mentioned.

Section 33 of the unit pole-piece 17 is provided with an integral appendage 42 which, through the medium of a nickel-silver spring hinge 43 serves to mount the ringer motor assembly which includes an armature 44. The armature 44 is provided with two bosses 45 which pass through suitable apertures in the lower section of the hinge 43 and are riveted over the hinge to secure the hinge to the armature. The other end of the hinge is fastened to the pole-piece appendage 42 by means of two screws 45′ which pass through holes in the hinge and are threaded into suitable holes in the appendage 42. By design, the axis of flexure of the hinge 43 is located so as to be coincident with the magnetic, or polar axis of the permanent magnet 25 for a purpose to be set forth more fully hereinafter. Suffice it to say at this time that by so locating the hinge 43 the biasing flux in gap $c$ (Fig. 8) contributes little, if any biasing effect on the armature 44.

The armature 44 has staked or otherwise secured thereto a Phosphor bronze clapper rod 47, a brass or steel wire stop rod 48 and a bronze wire spring 49 all of which project generally upward from the upper edge of the armature, viewing Fig. 1. The clapper rod 47 has its outer end suitably configured to provide a seat or bearing upon which a brass clapper 50 is floatingly mounted. This clapper assembly has been made the subject-matter of a copending application of R. T. Jenkins, Serial No. 788,344, filed November 28, 1947, now Patent No. 2,533,465, dated December 12, 1950.

The stop rod 48 is inclined away from normal in the direction of the coil 26 throughout the greater portion of its length and is bent back to normal for a short length at its outer end. This latter portion of the stop rod cooperates with the peripheral edge of a rotatable gong mounting 51 in controlling the stroke of the clapper rod in a manner to be briefly described hereinafter and as more fully described in a concurrently copending application of W. E. Whidden, Serial No. 86,547, filed April 9, 1949, now Patent No. 2,532,133, dated November 28, 1950.

Figure 2:
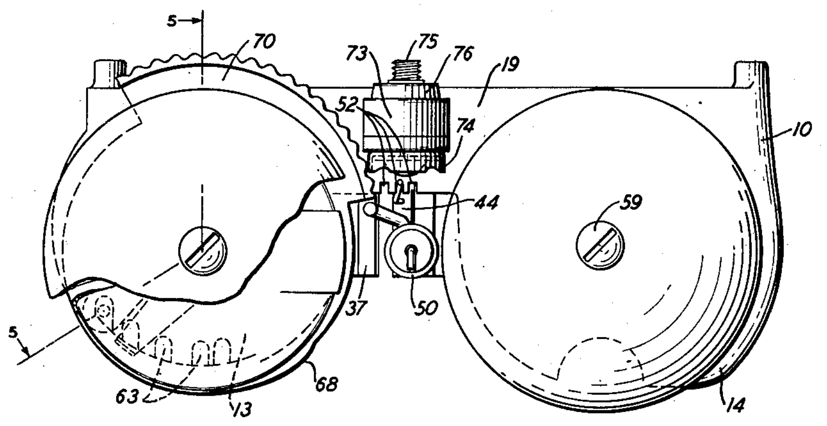
Fig. 2 is a top plan view of the ringer shown in Fig. 1. This view is characterized as "top" plan on the assumption that Fig. 1 depicts the ringer in a vertical plane; actually the ringer, in use, occupies a horizontal plane.

The bronze wire spring 49 is an armature biasing spring the upper end of which is adapted to be manually set in any of the three notches 52 which are formed in a ledge of the frame 10 which projects forward from the frame section or portion designated by the numeral 19 in Fig. 2. The bias on the armature may be adjusted by setting the upper end of spring 49 selectively in the notches 52.

The shelf-, or ledge-like section 14 of frame 10 is provided with a substantially centrally located integral post 55 (Fig. 6) which serves to mount the gong 21 and an associated resonator 56. The resonator is cup-shaped and is provided with a circular aperture at its apex, the edge of which rests upon and is staked to a shoulder 57 formed on the post 55 near its upper end. A circular ledge 58 is formed on the frame section 14 to effect a correspondingly shaped shoulder with which the resonator rim makes tensioned engagement. The gong 21 is clamped to the top of the post 55 by means of a screw 59 which passes through a lock washer 60 and an eccentrically located aperture in the gong into a suitably tapped hole in post 55.

A second gong 20, adjustable relative to gong 21, is centrally mounted on a rotatable gong mounting 51 comprising a disc-like element having a generally circular configuration. From the underside of the element 51 projects a stub shaft 6 which is adapted for rotation in a suitable aperture in the frame section 13. A post 61 projects from the other side of the mounting 51 so that its longitudinal axis is offset with respect to the longitudinal axis of the shaft 6. Thus, as the gong mounting 51 is rotated on its stub shaft 6 the spacing between the gongs 20 and 21 is increased or decreased depending upon the direction in which the mounting is rotated between two limiting stops. As the gong mounting is rotated, the spacing between the edge thereof and the upper end of the stop rod 48 is also adjusted so that by rotative manipulation of the gong mounting 51 the gong spacing and the stroke of the clapper rod 47 may be adjusted simultaneously to regulate the level of the sound signal emitted by the ringer. This feature is more elaborately set forth and is claimed in the W. E. Whidden application above identified. No further description of this feature need be included herein. Suffice it to say that a detent 62 secured to the outer extremity of the stub shaft 6 is provided with a means at its outer end which cooperates with suitably disposed notches 63 on the underside of the frame section 13 in latching the gong mounting 51 in any of its several settings. The detent 62 also includes a second arm 5 having an extension 64 which, after the gong mounting has been rotated through a predetermined arc toward the fixed gong, engages a stop 66 which is formed as an integral projection or shoulder on the rim of the frame section 13. If it is desirable to completely silence the ringer a detent component 67 is pulled downward until an auxiliary stop 65 formed as an integral lug on the underside of the gong mounting 51 is cleared by the detent extension 64 and the gong mounting rotated another step until the lug 65 abuts the stop 66. In this position of the gong mounting 51 the upper end of stop rod 48 is engaged by the camming projection 68 (Fig. 2) of the gong mounting and is effectively jammed against operation. The armature 44 and therefore, the clapper rod 47 are prevented from operating.

To facilitate adjusting the sound output of the ringer by the telephone subscriber the gong mounting 51 is provided with an integral projecting sector 70 which protrudes through, or is accessible through a suitable slit in the base of the telephone set. This portion of the mounting is provided with a serrated, or knurled edge to simplify the movement of the mounting by the subscriber.

The gong 20 and its associated resonator 71 are mounted on post 61 in the same manner as are the gong 21 and resonator 56 mounted on post 55. The mounting 51 is provided with a circular ledge 72 which serves the same purpose with respect to resonator 71 as does the ledge 58 with respect to resonator 56.

In order that the ringer may be mounted on the base of a telephone set the frame 10 is provided with a centrally apertured lug 73 which accommodates an eyelet assembly comprising an eyelet 74 and a screw 75 which passes through a rubber bushing 76 located in the aperture in lug 73. The screw 75 is screwed into a suitable hole in the base of the telephone set. The eyelet 74 is crimped over at four equispaced points to captivate the screw 75 while permitting it to turn in the eyelet.

With particular reference now to the use of the spring type hinge 43 it is well known that the characteristics of a ringer are in part determined by the net stiffness of the armature, that is, the rate at which the torque acting on the armature, in the absence of any ringing current, varies as the armature position is varied. This net stiffness can be considered as the difference between a magnetic stiffness and a mechanical stiffness. The magnetic stiffness is the rate at which the torque on the armature varies as the armature moves (in the absence of ringing current) if the biasing spring were not present and the spring hinge were replaced by a frictionless pivot located at the effective pivot of the spring hinge, while the mechanical stiffness is the rate at which the torque on the armature would vary if the permanent magnet were removed.

In the ringer of this invention the three notches 52 (Fig. 2) provide three different values of bias which must provide ringer characteristics suitable for the various uses to which the ringer is put in the telephone plant. Since there is a limited amount of space available particularly when it is desirable to keep the ringer as small as possible, the maximum permissible separation of the notches is limited. On the other hand the minimum permissible separation of the notches is limited by the strength of the material forming the separation between adjacent notches. These limitations upon the spacing of the notches together with the tensions required at the several notches set limits upon the permissible stiffness of the biasing spring.

If a pivot were used to support the armature this range of biasing spring stiffness would control the permissible magnetic stiffness since the net stiffness (defined above) must be held within a certain range in order to provide the desired operating characteristics of the ringer. By using a spring hinge, however, the permissible mechanical stiffness is no longer controlled by the permissible mechanical stiffness of the biasing spring. By the use of a spring hinge, therefore, the range of practically useful magnetic stiffness is materially increased, permitting arrangements heretofore of only theoretical interest.

Figures 7, 8:
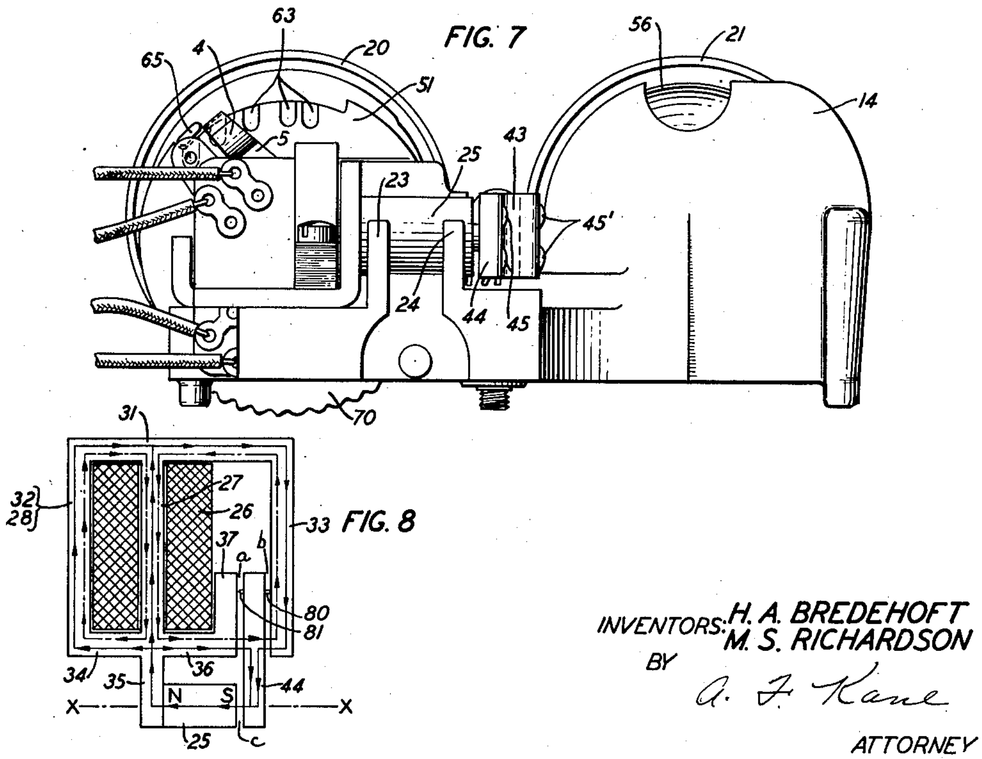
Fig. 7 is a bottom view of the ringer.
Fig. 8 is a diagrammatic illustration of the magnetic circuit involved in the ringer and discloses the various flux paths set up therein.

Fig. 8 illustrates diagrammatically the magnetic flux paths in the electromagnetic system embodied in the ringer of this invention. The biasing flux path, that is the path traversed by the flux set up by the permanent magnet 25, is represented by a continuous line while the path of the flux set up by the ringing current is represented by broken lines. The arrow heads on the continuous line indicate the direction of the biasing flux in the circuit at all times while the the arrow heads on the broken lines indicate the direction of the ringing current flux during one-half cycle of the ringing current, it being understood that this flux direction is reversed every half-cycle.

The permanent magnet flux emanating from the north pole N of the permanent magnet enters section 35 of the unit pole-piece and, on leaving it, traverses four parallel branches, one including section 36, air-gap $a$, armature 44 and back to the south pole S of the magnet 25 by way of air-gap $c$; another by way of section 34, iron shunt 32, sections 31, and 33, air-gap $b$, armature 44 and thence back to the permanent magnet 25 by way of air-gap $c$; a third over the same path just traced except that the silicon steel shunt 28 is substituted for the iron shunt 32; and a fourth path which includes the core 27 in place of the sections 34 and 32 in the path just traced.

When the armature is near the center of the air-gap in which it operates, the total torque resulting from the biasing flux in gaps $a$ and $b$ is small since they are substantially equal. The flux in gap $b$ tends to pull the armature 44 toward the pole 33 while the flux in gap $a$ tends to pull the armature toward pole 37. Hence, in so far as the biasing flux in gaps $a$ and $b$ is concerned, the armature 44 is substantially balanced. The biasing flux traversing the gap $c$ tends to pull the armature toward the permanent magnet 25. However, as will now be described, this flux contributes little, if any, to the torque or magnetic bias on the armature. It is apparent that the nature of the effect, if any, of the biasing flux in gap $c$ depends upon the location of the pivot point about which the armature vibrates. If the effective pivot point of the armature is located between the approximate polar axis of the magnet 25 and the stop pin 80 or 81, that is, above the broken line X (Fig. 8), the flux in gap $c$ will produce a torque tending to hold the armature 44 against the stop 80. Similarly, if the effective pivot point of the armature is located below the approximate polar axis of the magnet the attraction between the armature 44 and the magnet 25 will tend to hold the armature against the stop pin 81. In the ringer of this invention the pivot point of the armature is intentionally located substantially at the axis of the magnet 25 in order that the magnetic force in gap $c$ will not contribute materially to the torque upon the armature. This location of the armature pivot relative to the magnetic axis of the permanent magnet is particularly desirable from a manufacturing standpoint since is reduces one of the requirements on the length of air-gap $c$. In arranging a biased ringer it is necessary to develop a torque for maintaining the armature against a stop pin, either the stop pin which defines the non-operated position of the armature or the pin which defines its operated position, such as pins 80 and 81 respectively, of the ringer of this invention. This torque can be developed either by utilizing the force in gap $c$ or by other means. In manufacturing a biased ringer which will be uniform from unit to unit, the bias (torque) must be uniform from unit to unit. For a given armature pivot location the magnetic bias depends upon the amount of flux flowing through gap $c$ which, in turn, depends upon the length of gap $c$. If, as in the present case, the force in gap $c$, because of the location of the armature pivot at the axis of the permanent magnet, does not contribute to the magnetic bias the dimensions of the gap $c$ are less critical.

When ringing current is applied to the coil 26 the first half-cycle causes flux to flow downward in the core 27 whence it divides, part of the flux being additive to the biasing flux in section 34, in the shunts 32 and 28 and in a portion of section 31, and another part being additive to the biasing flux in section 36 and air-gap $a$ and opposed to the biasing flux in air-gap $b$, section 33 and a portion of section 31. Under this condition the total flux in gap $a$ predominates and the armature 44 moves counterclockwise (Fig. 8). This movement of the armature causes the clapper ball 50 to strike gong 20. On the next half-cycle of ringing current the conditions are reversed and the flux in gap $b$ predominates to assist the biasing spring 49 in restoring the armature to its original position.

It will be noted that during the first half-cycle of ringing current which results in the armature 44 being moved out of its non-operated position, the ringing current flux in the core 27 is directively opposed to the polarizing flux therein so that the total flux in the core 27 during this particular half-cycle is less than the total flux during the next half-cycle when the ringing current flux and biasing flux are additive. This is desirable, as will be described presently, since the magnetic action during the first-half cycle of ringing current is of relatively greater importance.

The biased ringer of this invention is arranged so that as the armature 44 moves from its non-operated position (resting against stop pin 80) to its operated position (resting against stop pin 81) energy is stored in the biasing spring 49. When the ringing current falls to zero, the energy in the biasing spring is sufficient to return the armature to its non-operated position and to cause the gong 21 to be struck by the clapper ball 50. Obviously, current flowing in the opposite direction will tend to move the armature from its operated position to its non-operated position, but the restoration of the armature is not dependent upon current flow. Thus it is apparent, particularly at current values near the minimum capable of operating the ringer, that the magnetic problem is to move the armature away from its non-operated position, the reverse motion of the armature being more or less automatically achieved.

With the arrangement employed in the present ringer, in which the biasing flux "cancels" a significant part of the ringing current flux in the core 27 during the half-cycles of ringing current associated with the movement of the armature from its non-operated position to its operated position there is a relatively small amount of flux flowing through the core during the time when it is desired that the ringer exert the greatest force upon the armature. This smaller quantity of flux which flows through the core when the ringer produces its maximum effort permits the use of a smaller core with attendant savings in core material and in copper in the operating coil and reduction in the over-all weight and size of the ringer.

While it is apparent that the combination of fluxes in the sections 28, 32, 36, 37 and part of section 31 (and to a lesser degree in sections 35 and part of section 33) is the converse of that in section 27 and that therefore, during the above-indicated half-cycles of ringing current the total flux therein exceeds the ringing current flux suggesting a possible increase in the amount of material in these sections, none of these sections lies within the coil and therefore can be made as large as necessary without having as great an effect upon the size and cost of the ringer as would the enlargement of the core 27.

Frequently, telephone ringers are employed in party line systems which require the passing of a direct-current pulse through the ringer winding for party identification purposes. When the ringer of this invention is connected to the telephone line so that the direct-current identifying pulse does not cause the armature to move and thereby produce tapping of one or both gongs, the fields generated in the ringer by the current pulse are such as to not tend to demagnetize the permanent magnet of the ringer. Since it is desirable to so connect the ringer as not to tap on identifying pulses such connection automatically connects the ringer so that its characteristics will not be impaired by the identifying pulses. This is made possible by the choice of the non-operated position of the armature as that which finds it resting against the stop pin 80.

What is claimed is:

1. In a telephone ringer, the combination of a pair of gongs, a clapper for striking said gongs, an armature supporting said clapper in a position to strike said gongs, and electromagnetic means for controlling the operation of said armature comprising a multileg unit pole-piece having the extremities of two of its legs mutually disposed to effect an air-gap, a core mounted on said unit pole-piece, a coil carried by said core, a pair of magnetic shunts of dissimilar metals and having unlike magnetic characteristics disposed on said unit pole-piece in parallel relation to said core, means for polarizing said armature, and means mounting said armature on said unit pole-piece for vibration in said air-gap.

2. In a telephone ringer, the combination of a pair of gongs, a clapper for striking said gongs, an armature supporting said clapper in a position to strike said gongs, and electromagnetic means for controlling the operation of said armature comprising a multileg unit pole-piece of magnetic iron having the extremities of two of its legs mutually disposed to effect an air-gap, a core of silicon steel laminations mounted on said unit pole-piece, a coil carried by said core, a pair of magnetic shunts, one of said shunts comprising one leg of said unit pole-piece and the other a silicon steel element removably mounted on said unit pole-piece in parallel relation to said core, means for polarizing said armature, and means mounting said armature on said unit pole-piece for vibration in said air-gap.

3. In a telephone ringer, the combination of a pair of gongs, a clapper for striking said gongs, an armature supporting said clapper in a position to strike said gongs, and electromagnetic means for controlling the operation of said armature comprising a multileg unit pole-piece of magnetic iron having the extremities of two of its legs mutually disposed to effect an air-gap, a core of silicon steel laminations mounted on said unit pole-piece in parallel relation to one of the legs thereof, a coil carried by said core, a pair of magnetic shunts one of which comprises the leg of said unit pole-piece paralleling the said core and the other of which comprises a silicon steel lamination mounted with said core on said unit pole-piece and straddling said coil, means for polarizing said armature, and means mounting said armature on said unit pole-piece for vibration in said air-gap.

4. In a telephone ringer, the combination of a frame, a pair of gongs, a clapper for striking said gongs, an armature supporting said clapper in a position to strike said gongs, and electromagnetic means for controlling the operation of said armature comprising a multileg unit pole-piece of magnetic iron mounted on said frame and having the extremities of two of its legs mutually disposed to effect an air-gap, a core of silicon steel laminations mounted on said unit pole-piece in parallel relation to one of the legs thereof, a coil carried by said core, a pair of magnetic shunts one of which comprises the leg of said unit pole-piece paralleling said core and the other of which comprises a silicon steel lamination mounted with said core on said unit pole-piece and straddling said coil, a bar type permanent magnet, means formed integral with said frame supporting said permanent magnet in close proximity to said air-gap, and means mounting said armature on said unit pole-piece for vibration in said air-gap.

5. In a telephone ringer, the combination of a frame, a pair of gongs mounted on said frame, an electromagnet comprising a unit pole-piece mounted on said frame and having a pair of juxtaposed areas defining an air-gap, a core mounted on said unit pole-piece, a coil mounted on said core, a cylindrical bar type permanent magnet, an armature, integral projections on said frame contoured to the dimensions and configuration of said magnet so as to effect a seat for said magnet, said projections being so located on said unit pole-piece relative to the air-gap defining areas thereof that said magnet, when seated, has its polar axis substantially at right angles to the planes of the air-gap defining areas of said unit pole-piece, means for mounting said armature for oscillatory movement in said air-gap comprising a flat type spring hinge having one end thereof fixed to said unit pole-piece, the other end fixed to one end of said armature and an intermediate portion about which said armature pivots located in the plane of the polar axis of said magnet, and means carried by said armature for striking said gongs.

6. In combination, in a telephone ringer, a pair of gongs, clapper means for striking said gongs, an armature supporting said clapper means, electromagnetic means comprising a multileg unit pole-piece having the extremities of two of its legs mutually disposed to effect an air-gap, a core mounted on said unit pole-piece so as to effectively bridge said air-gap, a coil carried by said core, a bar type cylindrical permanent magnet disposed adjacent one end of said core with its polar axis at right angles to the longitudinal axis of said core, and means for mounting said armature for oscillatory movement in said air-gap comprising a spring hinge secured to said unit pole-piece and to one end of said armature with its axis of flexure located on an extension of the polar axis of said permanent magnet and at right angles thereto.

7. The combination in a telephone ringer of a gong, clapper means for striking said gong, an armature supporting said clapper means, electromagnetic means for vibrating said armature including a coil supporting core, a unit pole-piece associated with said core and effecting an air-gap, and a bar type polarizing permanent magnet, and a spring type hinge supporting said armature on said unit pole-piece for vibration in said air-gap, said spring hinge having its axis of flexure located at right angles to and on an extension of the polar axis of said permanent magnet.

8. In a telephone ringer, the combination of a gong, a clapper for striking said gong, an armature supporting said clapper, a coil-supporting core, and magnetic circuit means for controlling the operation of said armature comprising said coil-supporting core and multiple shunt members of dissimilar magnetic properties disposed in said magnetic circuit in parallel relation to said coil-supporting core.

HAROLD A. BREDEHOFT.
MAX. S. RICHARDSON.

REFERENCES CITED

The following references are of record in the file of this patent:

UNITED STATES PATENTS

| Number | Name | Date |
|---|---|---|
| 1,901,443 | Garvin | Mar. 14, 1933 |
| 2,082,095 | Bredehoft | June 1, 1937 |